(12) United States Patent
Sigurdson et al.

(10) Patent No.: US 9,556,783 B2
(45) Date of Patent: Jan. 31, 2017

(54) AIR SUPPLY ADJUSTING DEVICE

(71) Applicant: Bayerische Motoren Werke Aktiengesellschaft, Munich (DE)

(72) Inventors: Tor Sigurdson, Ulricehamn (SE); Michael Obermeier, Prien (DE); Viktor Baer, Eching (DE)

(73) Assignee: Bayerische Motoren Werke Aktiengesellshaft, Munich (DE)

(*) Notice: Subject to any disclaimer, the term of this patent is extended or adjusted under 35 U.S.C. 154(b) by 231 days.

(21) Appl. No.: 14/309,542

(22) Filed: Jun. 19, 2014

(65) Prior Publication Data
US 2014/0299075 A1    Oct. 9, 2014

Related U.S. Application Data

(63) Continuation of application No. PCT/EP2012/073806, filed on Nov. 28, 2012.

(30) Foreign Application Priority Data
Dec. 20, 2011 (DE) .......... 10 2011 089 265

(51) Int. Cl.
*F24F 7/00* (2006.01)
*F24F 13/14* (2006.01)
(Continued)

(52) U.S. Cl.
CPC ............ *F01P 7/02* (2013.01); *B60K 11/085* (2013.01)

(58) Field of Classification Search
CPC ............ B60H 2001/3277; B60H 1/00842; F01P 7/10; F01P 2025/13; F01P 7/167; F01P 7/02; F02B 29/0493; F02B 29/0425; B60K 11/04; B60K 11/085; B60Y 2200/90; B60Y 2200/92; B60Y 2306/09
(Continued)

(56) References Cited

U.S. PATENT DOCUMENTS

| 1,375,198 A | 4/1921 | Ziegler |
| 1,699,020 A | 1/1929 | Raleigh |

(Continued)

FOREIGN PATENT DOCUMENTS

| CN | 201511811 U | 6/2010 |
| CN | 101879917 A | 11/2010 |

(Continued)

OTHER PUBLICATIONS

English translation of Chinese Office Action issued in counterpart Chinese Application No. 201280063185.X dated Dec. 14, 2015 (five pages).
(Continued)

*Primary Examiner* — John Kwon
*Assistant Examiner* — Tea Holbrook
(74) *Attorney, Agent, or Firm* — Crowell & Moring LLP

(57) ABSTRACT

An air intake adjusting system for a motor vehicle includes a plurality of struts which are arranged at distances from one another and can each be rotated about an axis of rotation such that, in a first position of the struts, the air intake adjusting system is open and, in a second position of the struts, the air intake adjusting system is closed. The struts each have a rotating section, through which the axis of rotation of the respective strut extends, and a flap section, which extends from the rotating section and, in the second position, rests against the rotating section of an adjacent strut. The rotating sections of the struts each have a first side and a second side which, when the struts are in the second position, converge against an intended approach flow direc-
(Continued)

tion of the air intake adjusting system such that they form an approach flow edge.

20 Claims, 3 Drawing Sheets

(51) Int. Cl.
  *F01P 7/02* (2006.01)
  *B60K 11/08* (2006.01)
(58) Field of Classification Search
  USPC ............ 123/41.04, 41.05, 41.01; 296/193.1;
   180/68.1; 137/601.08, 601.14, 599.01;
   251/285; 454/268, 309, 319, 325, 335
  See application file for complete search history.

(56) References Cited

U.S. PATENT DOCUMENTS

| | | | | |
|---|---|---|---|---|
| 1,763,838 A * | 6/1930 | Sergius | ............... | F01P 7/10 454/335 |
| 1,918,846 A * | 7/1933 | Johannsen | ........... | B60K 11/085 165/149 |
| 2,007,600 A | 7/1935 | Forbes | | |
| 2,200,733 A * | 5/1940 | Agerell | ............... | F01P 7/10 165/121 |
| 5,425,673 A * | 6/1995 | Mahlanen | ............... | A62C 2/14 137/601.09 |
| 6,918,456 B2 * | 7/2005 | Dennison | ............... | B60K 11/08 180/68.1 |
| 7,559,391 B2 * | 7/2009 | Bradley | ............... | B60K 11/085 180/68.1 |
| 8,307,932 B2 * | 11/2012 | Steller | ............... | B60R 19/48 180/68.1 |
| 8,646,552 B2 * | 2/2014 | Evans | ............... | B60K 11/085 180/68.1 |
| 8,727,054 B2 * | 5/2014 | Hori | ............... | B60K 11/085 165/41 |
| 8,807,166 B2 * | 8/2014 | Charnesky | ........... | B60K 11/085 137/601.08 |
| 2003/0106730 A1 * | 6/2003 | Dennison | ............... | B60K 11/08 180/68.1 |
| 2010/0071977 A1 | 3/2010 | Ritz et al. | | |
| 2010/0282438 A1 | 11/2010 | Wirth et al. | | |
| 2012/0019025 A1 * | 1/2012 | Evans | ............... | B60K 11/085 296/193.1 |

FOREIGN PATENT DOCUMENTS

| | | |
|---|---|---|
| DE | 23 46 784 A | 10/1974 |
| DE | 195 09 533 A1 | 10/1995 |
| DE | 10 2009 039 038 A1 | 3/2011 |
| EP | 2371602 A1 * | 10/2011 ............ B60K 11/085 |
| GB | 2 082 520 A | 3/1982 |
| JP | 59-68126 U | 5/1984 |
| WO | WO 02/086393 A1 | 10/2002 |
| WO | WO 2006/066680 A1 | 6/2006 |

OTHER PUBLICATIONS

International Search Report (PCT/ISA/210) dated Feb. 13, 2013 with English translation (five pages).
German Search Report dated Oct. 29, 2012 with partial English translation (10 pages).

* cited by examiner

AIR SUPPLY ADJUSTING DEVICE

CROSS REFERENCE TO RELATED APPLICATIONS

This application is a continuation of PCT International Application No. PCT/EP2012/073806, filed Nov. 28, 2012, which claims priority under 35 U.S.C. §119 from German Patent Application No. 10 2011 089 265.6, filed Dec. 20, 2011, the entire disclosures of which are herein expressly incorporated by reference.

BACKGROUND AND SUMMARY OF THE INVENTION

The invention relates to an air intake adjusting system for a motor vehicle, and to a motor vehicle equipped with such an air intake adjusting system.

In most current motor vehicles, a radiator grille is generally arranged on the front side of the motor vehicle, through which radiator grille an air current can flow in the direction of a radiator arranged in the engine compartment of the motor vehicle.

For taking over various functions, it is known from the state of the art to further develop the radiator grille such that it can be opened and closed.

The closing of the radiator grille has, for example, the function of improving the aerodynamic features of the motor vehicle. Such a radiator grille is known from German Patent Document DE 10 2009 039 038 A1. In the case of this radiator grille, a plurality of flaps are provided which can be rotated for opening and closing the radiator grille. In the closed position of the radiator grille, the flaps are arranged side-by-side and together form a uniform surface, adjacent flaps not being in contact with one another.

The radiator grille known from this patent document comprises an adjusting mechanism for rotating the flaps, the adjusting mechanism having to operate very precisely, so that the flaps arranged side-by-side form a uniform surface in the closed position of the radiator grille.

Furthermore, one gap respectively is formed between adjacent flaps, rain water or snow being able to penetrate into this gap unhindered. This may have the result that, during the cold season, adjacent flaps freeze to one another or are blocked by snow which accumulates in the respective gap which, on the whole, may lead to faulty functions of the radiator grille.

Furthermore, by means of the radiator grille known from the state of the art, the air flow pattern of the motor vehicle can be influenced only slightly.

It is an object of the invention to create an air intake adjusting system, which is improved at least in partial aspects, and/or to create an alternative air intake adjusting system.

An air intake adjusting system, particularly a radiator grille, according to the invention comprises a plurality of struts which are arranged at distances from one another and can each be rotated about an axis of rotation such that, in a first position of the struts, the air intake adjusting system is open and, in a second position of the struts, the air intake adjusting system is closed.

The struts each have a rotating section, through which the axis of rotation of the respective strut extends, and a flap section, which extends from the rotating section and, in the second position, rests against the rotating section of an adjacent strut, the rotating sections of the struts each having a first side and a second side which, when the struts are in the second position, converge against an intended approach flow direction of the air intake adjusting system such that they form an approach flow edge.

This means that the first and second sides form planes and/or surfaces which, in the cross-sectional view of the rotating section, converge against the intended approach flow direction of the air intake adjusting system such that, in the area, in which they abut, they form the approach flow edge. In this context, the approach flow edge is not necessarily a line or sharp edge but may also be a rounding formed in this area.

In the event that, in the cross-sectional view of the rotating section, the first and second side, for example, each have a radius or form concave surfaces, the approach flow edge is an area in which the first and second side abut or converge while changing their radii, i.e. the first and second side change their curvature behavior.

In the event that the first and second side, in the cross-sectional view of the rotating section, for example, each have a radius such that they form convex surfaces, the approach flow edge is an area in which the first and second side abut or converge while changing their radii.

The rotating sections of the air intake adjusting system may each be constructed such that the first side has a larger approach flow cross-section than the second side.

The approach flow cross-sections of the first sides of adjacent struts may differ such that the approach flow cross-sections increase in an arrangement direction of the struts.

When the struts are in the second position, the first sides preferably each face the flap section of an adjacent strut and the second sides each face the flap section corresponding to their strut.

In the second position of the struts, the flap sections rest against the side of the adjacent strut facing away from the approach flow edge.

In a preferred embodiment of the air intake adjusting system according to the invention, the flap sections each extend from a side of the rotating sections facing away from the approach flow edge on one side, and in the cross-section of the strut in a straight line such that, when the struts are in the second position, surfaces are formed between the rotating sections of the struts with respect to which the first and second sides are sloped in such a manner that they form the approach flow edges.

When the struts are in the first position, the side facing away from the respective approach flow edge and the first side preferably converge against the intended approach flow direction of the air intake adjusting system in such a fashion that they form an additional approach flow edge.

As a result of this design of the air intake adjusting system according to the invention, it is additionally achieved that the air intake adjusting system can be further developed such that, in the installed condition, it has the same visual effect in the first and second position of the struts. For example, when the air intake adjusting system in the form of a radiator grille is arranged on a front side of a motor vehicle, the space between the struts appears uniformly dark or black in the first position of the struts, because, in most cases, the elements behind the radiator grille are not colored. When the struts are rotated into the second position, the flap elements will close off the spaces and form a uniform surface, which is visually similar to the condition where the struts are in the first position. Furthermore, the rotating sections form an approach flow edge in both positions of the struts; i.e. the rotating sections also have the same visual effect in both positions of the struts. As indicated in the above, the air intake adjusting system according to the invention is advantageous in that it can easily be used in the visual range of a motor vehicle.

The distances between the struts may be larger in an upper area of the struts than in a lower area of the struts.

In an area with which they rest against the rotating section of the adjacent strut in the second position of the struts, the flap sections may have an elevation, by which a reduction of the contact surfaces of the rotating or flap sections is achieved.

The air intake adjusting system according to the invention may have a first group of struts and a second group of struts, in which case, the struts of the first group are rotated for the adjustment between the first and the second position in the opposite direction with respect to the struts of the second group.

A motor vehicle according to the invention comprises an air intake adjusting system according to the invention, particularly in the shape of a radiator grille.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
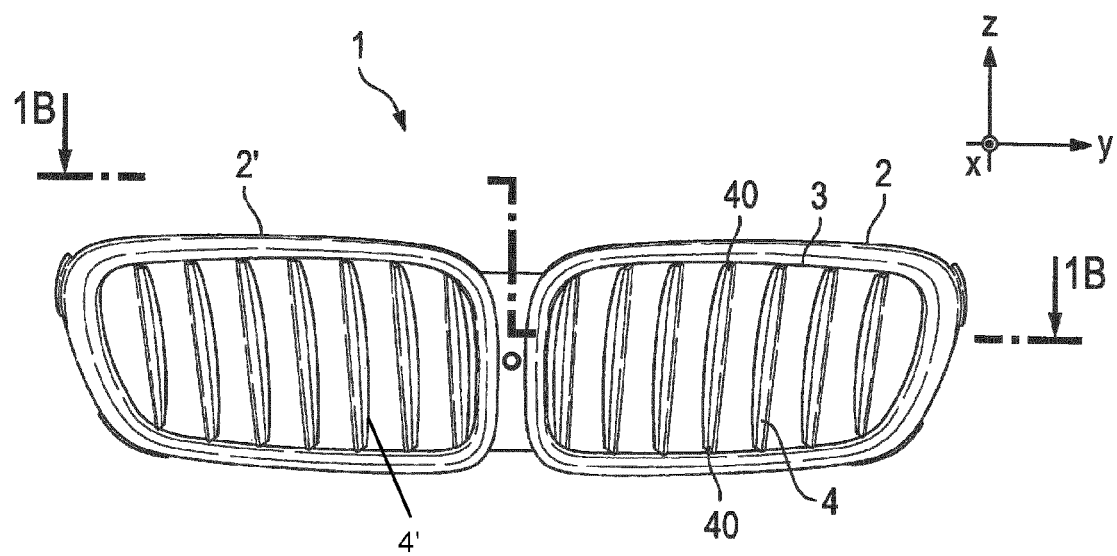
FIG. 1A is a frontal view of the air intake adjusting system according to an embodiment of the invention in a closed position.

FIG. 1A is an air intake adjusting system 1 according to an embodiment of the invention in a frontal view. Preferably, the air intake adjusting system is constructed as a radiator grille, which is arranged on a front side of a motor vehicle.

The view in FIG. 1A corresponds to the view of the air intake adjusting system 1, where the latter is installed, for example, as intended, into a front side of a motor vehicle.

The (negative) X-direction (perpendicular to the plane of the drawing of FIG. 1A) illustrated in FIG. 1A corresponds to the intended approach flow direction of the air intake adjusting system 1. In the intended installed condition of the air intake adjusting system 1, the positive X-direction corresponds to the driving direction of the motor vehicle.

The air intake adjusting system 1 includes a frame element 2 which defines an opening area 3 of the air intake adjusting system 1. In the opening area 3 of the air intake adjusting system 1, a plurality of struts 4 is arranged, which struts extend in their longitudinal direction (Z-direction) from one side of the frame element 2 to another, opposite, side of the frame element 2. At their respective ends, the struts 4 are connected with the frame element 2 and are disposed such that they can be rotated for the opening and closing of the opening area 3.

For the opening and closing of the air intake adjusting system 1, either all struts 4 can be rotated together or only a sub-number of struts can be rotated.

For rotating the struts, an adjusting mechanism may be provided which is preferably accommodated inside the frame 2 and can act upon the struts 4.

In the position of the air intake adjusting system 1 illustrated in FIG. 1A, the opening area 3 of the air intake adjusting system 1 is closed. The air intake adjusting system 1 takes up this position, for example, when the aerodynamic features of the vehicle are to be improved/changed, or when the motor vehicle is in a warm-up phase, in which the air flow to a radiator arranged behind the air intake adjusting system 1 is to be reduced.

Figure 1B:
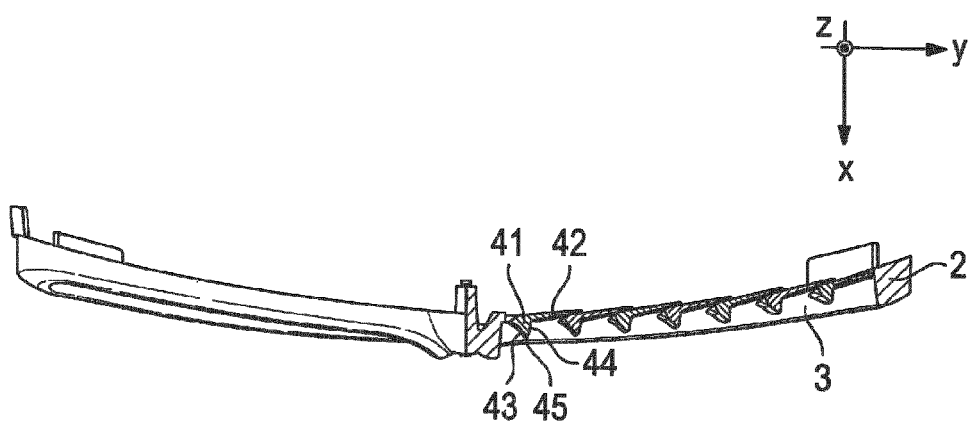
FIG. 1B is a partial sectional view of the air intake adjusting system illustrated in FIG. 1A taken along the intersecting line 1B-1B illustrated in FIG. 1A.

FIG. 1B is a partial sectional view of the air intake adjusting system 1. The partial sectional view 1 shows a section along the intersecting line 1B-1B illustrated in FIG. 1A.

As illustrated, each strut 4 comprises one rotating section 41 respectively, through which the axis of rotation of the respective strut 4 extends, and a flap section 42, which extends from the rotating section 41 preferably on one side and in a straight line. The struts 4 essentially have a generally L-shaped construction.

In a first position of the struts 4, which will be described with respect to FIGS. 2A and 2B, the opening area 3 of the air intake adjusting system 1 is open, so that, during the drive of a motor vehicle equipped with the air intake adjusting system 1, an air current can flow to a radiator arranged behind the system 1.

As a result of the rotation of the struts 4, the latter take up a second position illustrated in FIGS. 1A and 1B, in which the air intake adjusting system 1 is closed.

In this second position, the flap sections 42 close the spaces between the corresponding struts 4. As illustrated in FIG. 1B, the flap sections 42 have a linear design in cross-section such that, in the direction in which the struts 4 are arranged (Y-direction), the flap sections 42 extend essentially or predominantly in a straight line between the struts 4.

By means of their end situated in the Y-direction, the flap sections 42 each rest against the backside of an adjacent strut or cover the latter partially. This has the advantage that the struts 4 form a stop, and thereby the precise orientation of the struts 4 is defined. As a result the construction of the air intake adjusting system can be simplified because the adjusting mechanism can be implemented more easily.

The flap sections 42 can have different designs in their dimensions (Y-direction in FIGS. 1A and 1B), whereby the number of struts can be varied according to the requirement.

Figure 2A:
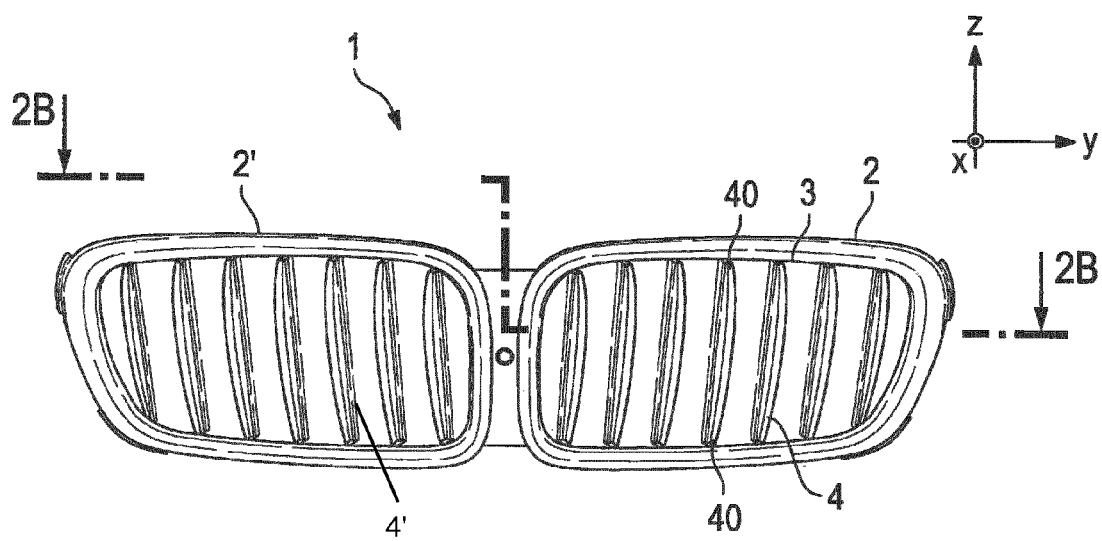
FIG. 2A is a frontal view of the air intake adjusting system according to an embodiment of the invention in an open position.
Figure 2B:
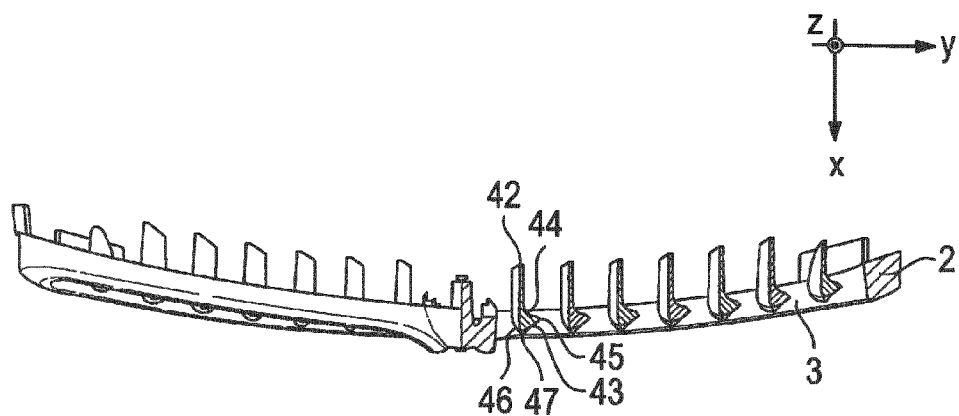
FIG. 2B is a partial sectional view of the air intake adjusting system taken along an intersecting line 2B-2B illustrated in FIG. 2A.

The backside of the air intake adjusting system 1 is the side which, when the installation direction of the air intake adjusting system 1 is as intended, faces the engine compartment of the motor vehicle (concave side of the air intake adjusting system in FIGS. 1A and 2B). The front side is the side of the air intake adjusting system 1 which correspondingly faces away (convex side of the air intake adjusting system in FIGS. 1B and 2B).

In the partial sectional view of the air intake adjusting system 1 illustrated in FIG. 1B, it is shown that the rotating sections 41 each have a first side 43 and a second side 44, which, in the cross-section of the respective strut 4, converge against the intended approach flow direction of the air intake adjusting system 1. In the area, in which the first and second sides 43, 44 converge, the rotating sections form an approach flow edge 45. The approach flow edge 45 may be rounded. Generally, the rotating sections form projections with respect to the flap sections or back in the position of the air intake adjusting system illustrated in FIG. 1B.

The first sides 43 of the rotating sections 41 or of the struts 4 point in the direction of the flap section 42 of an adjacent strut (except for one of the outer struts), in which case the second side points in the opposite direction, in which the flap section 42 of the respective strut extends.

The first and second sides 43, 44 are used for generating a defined flow which occurs between adjacent struts 4 in the closed condition of the air intake adjusting system 1.

The flow pattern of the motor vehicle can thereby be at least partially changed.

Generally, in the case of a driven motor vehicle, the air flows from the front side, on which the air intake adjusting system 1 is arranged, by way of the front hood to a windshield of the motor vehicle, by which the flow is directed partially over the motor vehicle or laterally past it. In the closed condition of the air intake adjusting system, this flow can be influenced by the approach flow edges 45, in which case, for example, undesirable acoustic effects at side view mirrors or partially opened side windows can be reduced or completely avoided.

In addition, the area, in which the flap section 42 rests against the rotating section 41, is at least partially protected or relieved such that the approach flow of the air intake adjusting system is not necessarily guided into this area.

The two sides 43, 44 of the struts 4 generate a flow in the direction of this area. The first side 43 of the adjacent strut generates a flow opposed thereto, which counteracts the flow generated by the second side 44.

To this extent, the areas by which the flap sections 42 rest against the adjacent rotating sections 41 are to a certain degree protected from a directly affecting approach flow, so that a collection of rain water or snow in this area is at least partially prevented during the drive of the motor vehicle.

Viewed in cross-section, the first sides 43 are preferably in each case more sloped with respect to the flap sections 42 than the second sides 44. As a result, the first sides 43 along the longitudinal direction (Z-direction) of the respectively strut 4 have a larger approach flow cross-section than the second sides 44.

In FIGS. 2A and 2B, the air intake adjusting system 1 is illustrated in the same views as in FIGS. 1A and 1B, wherein the struts 4 are in the first position, in which the air intake adjusting system 1 is open.

As illustrated, the side 46 facing away from the approach flow edge 45 and the first side 43 of the struts each form a further approach flow edge 47, which during the drive of the motor vehicle, provide an air flow in the direction of the opened sections between the struts 4.

As illustrated in the figures, the air intake adjusting system may be constructed of a first group of struts 4, which are preferably arranged in the frame element 2, and of a second group of struts 4', which are preferably arranged in a further frame element 2'. The frame elements 2, 2' and the corresponding struts 4, 4' are preferably symmetrical with respect to a center axis.

This further development of the air intake adjusting system 1 is advantageous when the air intake adjusting system is arranged in the front area of the motor vehicle and the center axis coincides with the axis of symmetry of the front area of the motor vehicle.

The flow over the motor vehicle can hereby preferably be symmetrically influenced.

Figure 1C:
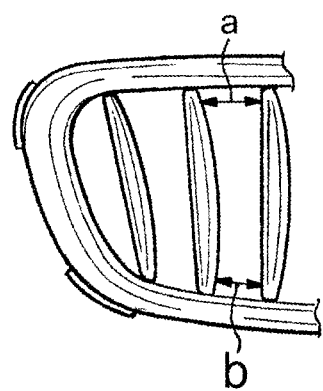
FIG. 1C is a partial frontal view of the air intake adjusting system illustrating an aspect of the invention.

Generally, the distance between two struts in an upper and lower area, i.e. the distance at the linking areas to the frame element 2,2' may differ (compare dimension "a" and "b" FIG.1C) such that the struts 4, 4' will be fanning. With respect to the center axis illustrated in the figures, the struts 4, 4' will then extend in a steeper fashion further on the inside than on the outside, which permits a vehicle-dependent influencing of the flow.

In addition, for influencing the flow, the approach flow cross-sections of the first sides 43 may increase in an arrangement direction of the struts. In the figures, the approach flow cross-sections increase starting from the center axis in both frame elements 2, 2'.

The further development of the air intake adjusting system 1 also makes it possible that the appearance of the air intake adjusting system 1 in the closed position is to the largest extent identical with that in the opened position, because of their set-back course with respect to the rotating sections 41, the flap sections 42 move visually into the background and generate a similar appearance with respect to the open spaces when the air intake adjusting system is installed in a motor vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air intake adjusting system for a motor vehicle, comprising:
    a plurality of struts spaced apart from one another, each strut being rotatable about an axis of rotation, wherein
    in a first position of the struts, the air intake adjusting system is open and, in a second position of the struts, the air intake adjusting system is closed,
    each strut comprises a rotating section, through which the respective axis of rotation extends, and a flap section, the flap section extending from the rotating section, and, in the second position, resting against the rotating section of an adjacent strut, and
    the rotating sections of the struts each have a first side and a second side, the first side and the second side converging forward in a driving direction of the motor vehicle against an intended approach flow direction of the air intake adjusting system to form an approach flow edge when the struts are in the second position.

2. The air intake adjusting system according to claim 1, wherein the first side of the rotating sections is configured to have a larger approach flow cross-section than the second side.

3. The air intake adjusting system according to claim 2, wherein the approach flow cross-sections of different struts differ such that the approach flow cross-sections increase in an arrangement direction of the plurality of struts.

4. The air intake adjusting system according to claim 3, wherein
    the first sides each face the flap section of an adjacent strut, and the second sides each face the flap section of their own strut.

5. The air intake adjusting system according to claim 3, wherein
    the flap sections extend from a side of the rotating sections facing away from the approach flow edge in a straight line such that, when the struts are in the second position, planar surfaces are formed between the rotating sections having the first sides and the second sides that are sloped to form the approach flow edges.

6. The air intake adjusting system according to claim 2, wherein
the first sides each face the flap section of an adjacent strut, and the second sides each face the flap section of their own strut,
in the second position of the struts, the flap sections rest against a side facing away from the approach flow edge of the adjacent strut.

7. The air intake adjusting system according to claim 6, wherein
in the first position, a side facing away from the approach flow edge and the first side converge against an intended approach flow direction of the air intake adjusting system so as to form an additional approach flow edge.

8. The air intake adjusting system according to claim 2, wherein
the flap sections extend from a side of the rotating sections facing away from the approach flow edge in a straight line such that, when the struts are in the second position, planar surfaces are formed between the rotating sections having the first sides and the second sides that are sloped to form the approach flow edges.

9. The air intake adjusting system according to claim 1, wherein
in the first position, a side facing away from the approach flow edge and the first side converge against an intended approach flow direction of the air intake adjusting system so as to form an additional approach flow edge.

10. The air intake adjusting system according to claim 1, wherein a distance between adjacent struts in an upper area of the struts in an arrangement direction of the struts is larger than in a lower area of the struts.

11. The air intake adjusting system according to claim 1, wherein the flap sections comprise an elevation arranged in an area which the flap sections rest in the second position against the rotating section of the adjacent strut.

12. The air intake adjusting system according to claim 1, wherein
the plurality of struts comprise a first group of struts and a second group of struts, wherein the struts of the first group for adjustment between the first and second position are rotated in opposite directions than struts of the second group for adjustment between the first and second positions.

13. The air intakes adjusting system according to claim 1, further comprising a frame in which the plurality of struts are arranged.

14. A motor vehicle, comprising an air intake adjusting system, the air intake adjusting system comprising:
a plurality of struts spaced apart from one another, each strut being rotatable about an axis of rotation, wherein
in a first position of the struts, the air intake adjusting system is open and, in a second position of the struts, the air intake adjusting system is closed,
each strut comprises a rotating section, through which the respective axis of rotation extends, and a flap section, the flap section extending from the rotating section, and, in the second position, resting against the rotating section of an adjacent strut, and
the rotating sections of the struts each have a first side and a second side, the first side and the second side converging forward in a driving direction of the motor vehicle against an intended approach flow direction of the air intake adjusting system to form an approach flow edge when the struts are in the second position.

15. The motor vehicle according to claim 14, wherein the first side of the rotating sections is configured to have a larger approach flow cross-section than the second side.

16. The motor vehicle according to claim 15, wherein the approach flow cross-sections of different struts differ such that the approach flow cross-sections increase in an arrangement direction of the plurality of struts.

17. The motor vehicle according to claim 15, wherein
the first sides each face the flap section of an adjacent strut, and the second sides each face the flap section of their own strut,
in the second position of the struts, the flap sections rest against a side facing away from the approach flow edge of the adjacent strut.

18. The motor vehicle according to claim 17, wherein
in the first position, a side facing away from the approach flow edge and the first side converge against an intended approach flow direction of the air intake adjusting system so as to form an additional approach flow edge.

19. The motor vehicle according to claim 15, wherein
the flap sections extend from a side of the rotating sections facing away from the approach flow edge in a straight line such that, when the struts are in the second position, planar surfaces are formed between the rotating sections having the first sides and the second sides that are sloped to form the approach flow edges.

20. The motor vehicle according to claim 14, wherein
in the first position, a side facing away from the approach flow edge and the first side converge against an intended approach flow direction of the air intake adjusting system so as to form an additional approach flow edge.

* * * * *